US006263429B1

(12) United States Patent
Siska

(10) Patent No.: US 6,263,429 B1
(45) Date of Patent: Jul. 17, 2001

(54) DYNAMIC MICROCODE FOR EMBEDDED PROCESSORS

(75) Inventor: Charles P. Siska, Costa Mesa, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/164,256

(22) Filed: Sep. 30, 1998

(51) Int. Cl.[7] .......................................................... G06F 7/38

(52) U.S. Cl. ......................... 712/245; 712/247; 712/243; 712/210

(58) Field of Search ..................................... 712/245, 243, 712/210, 24, 246, 247, 211, 214, 215, 216

(56) References Cited

U.S. PATENT DOCUMENTS

| 4,821,183 | * | 4/1989 | Hauris .................................. 712/243 |
| 5,500,942 | * | 3/1996 | Eickemeyer et al. ................ 712/210 |
| 5,652,852 | * | 7/1997 | Yokota ................................ 712/208 |
| 5,815,721 |   | 9/1998 | Benitez ............................... 395/709 |
| 5,852,741 | * | 12/1998 | Jacobs et al. ......................... 712/24 |
| 6,044,450 | * | 3/2000 | Tsushima et al. ..................... 712/24 |

OTHER PUBLICATIONS

I. Chen, P. Bird, and T. Mudge, *The Impact of Instruction Compresion on I–cache Performance*, Department of Electrical Engineering and Computer Science, The University of Michigan, pp. 1–8, Feb. 1997.

P. Bird and T. Mudge, *An Instruction Stream Compression Technique*, Department of Electrical Engineering and Computer Science, The University of Michigan, pp. 1–21, Nov. 1996.

M. Kozuch and A. Wolf, *Compression of Embedded System Programs*, Department of Electrical Engineering, Princeton University, pp. 270–277, Copyright 1994.

A. Wolfe and A. Chanin, *Executing Compressed Programs on An Embedded RISC Architecture*, Department of Electrical Engineering, Princeton University, pp. 81–88, Copyright 1992.

(List continued on next page.)

Primary Examiner—Richard Hjerpe
Assistant Examiner—Mackly Monestine
(74) Attorney, Agent, or Firm—Snell & Wilmer L.L.P.

(57) ABSTRACT

A method of compressing programs, especially those used in embedded systems, is provided which allows greater program compression without significantly degrading system performance. The method provides: first, examining an entire program for sequences of lines of code, which may or may not constitute basic blocks; determining which sequences are identical or are identical except for a variation in a predetermined number of Elements within the sequence; designating and saving one uncompressed version of the identified sequences in memory as a specific microroutine, saving the Elements which differentiate the saved sequence from the various nearly identical sequences; and, assembling a version of the program consisting of original lines of code and microcalls. The microcall is a line of code which instructs a processor to implement a previously saved microroutine and provides an indication as to which Elements in the microroutine are to be replaced and where to find the substitute Elements. In a preferred embodiment, the Elements replaced are parameters such as register values. However, the present invention may be suitably modified to accommodate substitutions of any portion of a code including sequences and/or lines of instruction, operands, opcodes, or the like. Additionally, in an alternative embodiment, the determination of when the end of a microroutine code has been reached is facilitated by providing a single bit indicator table which corresponds to the lines of code stored as microroutines in memory, such that when the single bit reads a particular value, the last instruction of the microroutine has been reached.

21 Claims, 9 Drawing Sheets

OTHER PUBLICATIONS

C. Lefurgy, P. Gird, I. Chen, T. Mudge, *Improving Code Destiny Using Compression Techniques*, EECS Department, University of Michigan, Copyright 1997.

D. Kirovski, J. Kim and W. Manigione–Smith, Procedure Based Program Compression, The Department of Computer Science and Electrical Engineering, The University of California, 1997.

S. Liao, *Code Generation and Optimization for Embedded Digital Signal Processors*, Department of Electrical Engineering and Computer Science, Massachusetts Institute of Technology, Copyright 1996.

Liao et al., "Coide Density Optimization for Embedded DSP Processors Using Data Compression Techniques," Proceedings, 16th Conference on Advanced Research in VLSI, Preedings, 16th Conference on Advanced Research in VLSI, Chapel Hill, NC, USA, Mar. 27–29, 1995, pp. 272–285.

"Synonyms for Common Subexpression Elimination," IBM Technical Disclosure Bulletin, US, IBM Corp., vol. 37, No. 12, Dec. 1, 1994, pp. 607–609.

Patent Cooperation Treaty International Search Report, Apr. 7, 2000.

* cited by examiner

DYNAMIC MICROCODE FOR EMBEDDED PROCESSORS

TECHNICAL FIELD

The present invention relates generally to embedded microprocessors. More particularly, the present invention relates to a microcode based compression technique for use with embedded microprocessors.

BACKGROUND OF THE INVENTION

Today it is quite common for everyday devices and systems to incorporate computer technology. Personal digital assistants, pagers with integrated data and message services, smart phones, television remote controls, automotive engine controllers, and the like all rely upon microprocessors and/or microcontrollers to perform numerous and varied functions. These microprocessors and/or microcontrollers are commonly referred to as embedded processors. In most of these devices, the embedded processor executes a predefined, stored program.

As demands for more powerful, smaller, lighter, less expensive, and/or more energy efficient devices has risen, system designers have been tasked with packing more features into ever smaller components. These features are commonly controlled by a program (an instruction code) contained within an embedded processor. Since the size of the program used in embedded processors has quickly become a significant constraint on the miniaturization of electronic devices, reducing the program size has become a primary goal of system designers. A reduced code size often results in a reduction of a device's cost, size, weight, and/or power consumption. Additionally, as the profit margin on semiconductor devices ("chips") erodes, designers may be tasked with providing more devices per a given wafer area. Thus, miniaturization is today a primary goal of system designers.

Numerous approaches have been proposed for reducing the length of a program used in an embedded processor. One approach was proposed in 1996 by Peter L. Bird and Trevor N. Mudge in their paper, "An Instruction Stream Compression Technique" (hereafter "Bird and Mudge"). In their approach, Bird and Mudge analyze a program for patterns of frequently used sequences of instructions. This analysis is performed for all sequences within basic instruction blocks. A basic instruction block is a sequence of instructions within a program in which no jumps exist. For purposes of this description, "jumps" in a program shall refer to any deviation in the sequential processing of a sequence of lines of code including branches, conditional branches, sub-routines, and the like. The basic instruction block is always entered at the top of the sequence and exited only at the bottom of the sequence. Since jumps commonly occur in programs, basic instruction blocks may not be prevalent in a given program. Additionally, since basic instruction blocks are often quite short, the number of available patterns in a given program are often reduced. Hence the utility of the Bird and Mudge approach is often quite limited.

Additionally, under the Bird and Mudge approach, after the program is analyzed and patterns of basic instruction blocks identified, those patterns with the highest frequency of occurrence are assigned an opcode and are stored in Read Only Memory (ROM). The opcode is then placed in a directory which identifies the specific location in memory of the associated instruction sequence. The program 100 is then reassembled and consists of original lines of code 110 interleaved with opcodes 112, as shown in FIG. 1.

During an instruction fetch cycle, the decoder within a Central Processing Unit (CPU) checks the line of code of the incoming instruction. If no opcode 112 exists, the line of code is an uncompressed instruction which is executed in the regular manner. If an opcode 112 exists, the opcode 112 references the memory location at which the actual code sequence resides. The actual code sequence is then recalled from memory and executed.

In order to keep track of the location of the compressed instructions corresponding to an opcode, Bird and Mudge utilize a look-up table 114, wherein the opcode 112 identifies the location of the first instruction of the compressed sequence in the look-up table 114. The look-up table 114 also provides the location in memory 116 of the second instruction (if one should exist) of the compressed sequence and the number of remaining instructions 118, as shown in FIG. 1. For example, when the embedded processor encounters opcode three 120 during an instruction processing cycle, the embedded processor proceeds to the opcode three location 122 in the look-up table 114. The embedded processor executes the first instruction 124 associated with opcode three 120 and then proceeds to the memory location 128 of the second instruction (in this example, memory address 07002). Upon executing a second instruction 129, the processor proceeds in sequential order through memory 130 until the number of instructions 126 indicated in the look-up table 114 have been executed (in this case four instructions). The processor then resumes normal instruction processing in the original program code (thus, in this example the processor returns to the third instruction 136).

While the Bird and Mudge approach is effective, it has numerous disadvantages. First, this approach requires that space on the chip be allocated to track the number of instructions associated with an opcode, and the number of instructions executed or which remain to be executed. Thus, some sort of counter must be included in the processor (or the processor's normal routines interrupted to keep track of the instruction count). Additionally, the second table requires the allocation of additional space on the chip. Thus, this approach requires more space, more power, and inhibits miniaturization.

Another disadvantage of the Bird and Mudge approach is that it only works for instruction sequences that are contained within a basic instruction block (i.e., this approach does not work for instruction sequences which contain jumps). Since many programs have numerous jumps and conditional branches, the application of Bird and Mudge is often extremely limited. Additionally, the Bird and Mudge approach can not be used with arguments (wherein an argument is a portion of an instruction which references another value). Designers prefer a sequence of instructions which correspond to a given code word, where the instructions can be parameterized. Ideally, the arguments in a sequence of instructions can be suitably replaced such that the instructions can be flexibly configured to function with specific variables. For example, a sequence of instructions in an aircraft's embedded processor which utilizes the wind speed to determine the desired landing speed is preferably parameterizable such that the value of the wind speed may be suitably inserted into any calculations which require wind speed.

In summary, Bird and Mudge unnecessarily allocates memory to hold the needed tables and does not allow for jumps, parameterization, or the like. Thus, Bird and Mudge do not disclose a desirable approach.

Another approach for reducing the size of the instruction set in embedded processors was proposed in 1997 by Darko Kirovski, Johnson Kin, and William H. Mangione-Smith in their paper, "Procedure Based Program Compression" (hereafter, "KKMS"). In the KKMS approach, the entire program is compressed. At run time, decompression of the entire program is 10 accomplished in real-time, i.e., each procedure is decompressed by the processor as needed. Each procedure is compressed as an entity (including jumps and arguments contained within a given procedure) and stored in a dedicated region of Random Access Memory (RAM). Inter-procedure calls and global references are stored in a software cache which is accessed via a Directory Service. As procedures are needed by the processor for a given operation, the Directory Service is consulted, and a linking tool is utilized to identify the location of the desired procedure and where to return after the procedure has been implemented. The procedure is then called into a pcache (i.e., a cache of volatile memory commonly provided on the processor chip; the pcache commonly holds frequently executed instructions), decompressed, and executed. Basically, this Directory Service approach utilizes a 10 step process to retrieve compressed procedures. This process is as follows:

1. A Source (which could be a previously run procedure, or the like) invokes the linking tool with a request for a desired procedure;
2. If the desired procedure is already in the pcache (i.e., was previously called into the pcache and has not been subsequently overwritten in whole or in part) then skip to step 9;
3. The target address of the desired procedure in the compressed memory is determined by consulting the Directory Service, which also provides the size of the compressed code;
4. A determination is made as to whether the pcache has enough contiguous free space to hold the desired procedure after decompression, if so then go to step 8;
5. A determination is made as to whether the pcache has enough fragmented space to hold the desired procedure, if so then go to step 7;
6. Procedures are marked for deletion from the pcache until enough free space is available to hold the desired procedure;
7. Fragmented space in the pcache is coalesced into a contiguous block;
8. The desired procedure is decompressed and assigned to a location within the pcache;
9. In the pcache, at the end of the decompressed procedure, a return identifier is placed which identifies the Source such that after execution of the desired decompressed procedure the processor knows where to resume its operations; and
10. The desired procedure is executed.

As can be seen from the above procedure, the KKMS approach requires extensive processing time to identify, allocate pcache space, decompress, and execute a procedure. As a trade-off, the KKMS approach provides an extremely smaller instruction set which allows for a smaller RAM and thereby probably reduces power demands. However, as shown by the above 10 step process, the KKMS approach probably significantly slows down the processing speed of the program. In order to execute a procedure under the KKMS approach, a linking tool must be accessed, which then identifies the location of a procedure, determines whether a pcache has sufficient vacancies to hold the uncompressed procedure (if not the linking tool frees up space), calls the procedure, decompresses the procedure, identifies a return address, and then executes the procedure. Thus the KKMS approach is comparable to being a travel agent and trying to obtain rooms at a hotel for a major convention, kicking out those guests who are not as important as the convention goers (the least important guests are evicted first), relocating other guests to other rooms so that a contiguous wing of the hotel is reserved for the convention, telling the convention goers where they are staying, having the convention, and doing all the above at the exact moment the convention is desired to begin. One can truly appreciate the delays and inefficiencies of such an approach. Thus, the KKMS approach is not preferred because it is too slow.

Another approach for reducing the size of the instruction set in embedded processors was proposed by Charles Lefurgy, Peter Bird, I-Cheng Chen, and Trevor Mudge in their paper, "Improving Code Density Using Compression Techniques", copyright 1997, IEEE (hereafter, "LBCM"). In the LBCM approach, 8, 12, or 16 bit code words may be utilized instead of only 8 bit (one byte) code words. Thus, the LBCM approach utilizes the Bird and Mudge approach with the addition of a pseudo-variable length code word. The LBCM approach divides the code word into segments of nibbles (i.e., 4 bits), thereby allowing greater code compaction at the expense of somewhat slower procedure execution.

However, the LBCM approach suffers many of the deficiencies of the Bird and Mudge approach; namely, relative branches are not compressed, they only compress the instruction sequences within a basic instruction block, and they do not include arguments in their decompressions. Additionally, utilizing a 4-bit variable length code word presents unique hurdles in CPU processing. Normally, CPU instructions are aligned on 8 bit boundaries. Utilizing 4-bit boundaries may require the CPU to determine and modify the location within which an instruction starts. Thus, this approach imposes unnecessary addressing requirements upon the CPU which may decrease the CPU's processing speed and thereby limit the application's capabilities.

In "Code Generation and Optimization for Embedded Digital Signal Processors", Ph.D. Dissertation, Massachusetts Institute of Technology, 1996, Stan Yi-Huang Liao (hereafter "Liao") proposed two approaches for reducing the size of the instruction set in embedded processors; one approach without hardware assistance and one approach with hardware assistance. The approach without hardware assistance basically analyzes a program for common sequences of instructions. These common sequences are then entered and stored in a table (identified as a Dictionary in Liao). Each common sequence is appended with a return instruction such that when the common sequence is extracted from the Dictionary, they are replaced with a call. Thus, this non-hardware assisted approach basically utilizes a subroutine.

The hardware assisted approach also has a Dictionary (or a table entry) which is not appended with a return instruction. Instead, a hardware mechanism (for example, a counter) is told at the beginning of the instruction sequence how many instructions are contained in a specific procedure. The hardware mechanism then counts the number of instructions executed from the table and returns to the source program when the pre-identified number of instructions have been executed. Thus, the hardware assisted approach, when compared to the non-hardware assisted approach, reduces the code size by eliminating the return instruction.

However, the Liao approaches are not optimal. In the hardware assisted approach, only basic blocks are analyzed and compressed and the additional hardware is needed. Additionally, both Liao approaches do not allow arguments and/or parameters to be compressed.

Additional approaches at reducing the size of the instruction code in embedded processors were proposed by Michael Kozuch and Andrew Wolfe in 1994 in their paper, "Compression of Embedded System Programs", and by Andrew Wolfe and Alex Chanin in 1992 in their paper "Executing Compressed Programs on An Embedded RISC Architecture". Both of these approaches utilize a compression mechanism which requires decompression of program parts at run-time. Additionally, each contains an area in which decompressed program parts may be temporarily stored, and each utilizes procedures commonly known in the art to compress hard disk drive space or to send files over the Internet. Thus, these approaches, like KKMS, use memory space to identify where additional code sequences are located and to determine when to execute a jump. As a result, these approaches are often CPU intensive and undesirable in many embedded processors.

In summary, numerous approaches have been proposed which reduce the size of the program in embedded processors. All of these approaches, however, require either a trade-off in memory size and/or CPU processing speed (i.e., either larger memory is needed or a slower processing speed occurs). Additionally, many of the prior art approaches do not allow for jumps, parameters, or arguments to be compressed. Thus, a compression scheme which allows any program to be compressed without significantly decreasing the processing speed of the embedded processor is needed.

SUMMARY OF THE INVENTION

The present invention preferably provides a technique for compressing a program utilized by an embedded processor without significantly degrading the performance of the embedded processor. Additionally, the compression technique of the present invention may preferably be utilized on individual code modules, linked executables, non-embedded processor programs, and any other sequence of lines of code.

The compression technique of the present invention preferably provides for the compression of a greater portion of a program, by expanding the search for common sequences beyond basic instruction blocks and identifying sequences within basic instruction blocks and other portions of a program which are suitable for compression. Upon identification of sequences suitable for compression, the present invention preferably identifies each sequence of lines of code with a microroutine. Each microroutine consists of the lines of code from one of the sequences of each collection of Substantially Similar sequences. The microroutines are then suitably stored in an uncompressed format in a microcode area within memory. The resulting compressed program is preferably comprised of individual lines of code (or sequences thereof) interlaced with microcalls. The microcalls preferably reference specific microroutines for implementation.

In addition to referencing the specific microroutine to be accessed within a program, each microcall may contain a suitable swapping identifier. The swapping identifier preferably identifies parameters, registers, instructions, operands, opcodes, or the like which distinguish one microroutine from another. Additionally, the swapping identifier allows the processor to suitably replace a parameter, or the like in a previously saved microroutine. Thus, one microroutine may be utilized as the base code for numerous code sequences when all the Elements in the Substantially Similar sequences are identical except for a difference in a register, opcode, instruction, or the like . The present invention provides for a greater compression of a program by allowing a substitution mechanism which provides for greater commonality between sequences of lines of code than exist under current methods. Additionally, the compression technique of the present invention may be suitably modified to accommodate numerous variations between sequences of lines of code while still identifying a base sequence. Thus, the present invention allows Substantially Similar sequences of lines of code to be compressed into one microroutine.

The compression technique of the present invention also provides for the identification of the last line of code in a compressed sequence of lines of code without requiring a separate return instruction at the end of the sequence or using a counter. The present invention preferably utilizes a single bit for each line of code to indicate whether a particular line of code is the last line of a sequence of lines of code.

The present invention also provides a compression technique which does not require real-time decompression of a program or portions of a program. In the present invention, common sequences are identified as microroutines and are stored in an uncompressed format in memory. Microcalls are then utilized throughout the compressed version of the program to reference each specific microroutine and recall the uncompressed sequence from memory. Thereby, real-time decompression is avoided and system performance is not degraded by the compression method of the present invention.

BRIEF DESCRIPTION OF THE DRAWING FIGURES

DETAILED DESCRIPTION OF A PREFERRED EMBODIMENT OF THE INVENTION

The present invention generally provides a compression technique for programs, and preferably for programs and instruction sets processed by embedded processors. While the present invention is described in the context of compressing programs for embedded processors, it is to be understood that the present invention is not to be so limited. The compression technique of the present invention may be utilized in any processor based system.

The compression technique of the present invention suitably provides for the compression of significantly greater portions of programs than techniques currently known in the art because the present invention identifies and compresses a greater number of sequences of lines of code within programs. The compression technique of the present invention suitably compresses identical sequences of lines of code. Additionally, in a preferred embodiment, the compression technique of the present invention suitably compresses Substantially Similar sequences of lines of code. The compression of sequences of lines of code under the technique of the present invention is preferably accomplished as described below.

Figure 1:
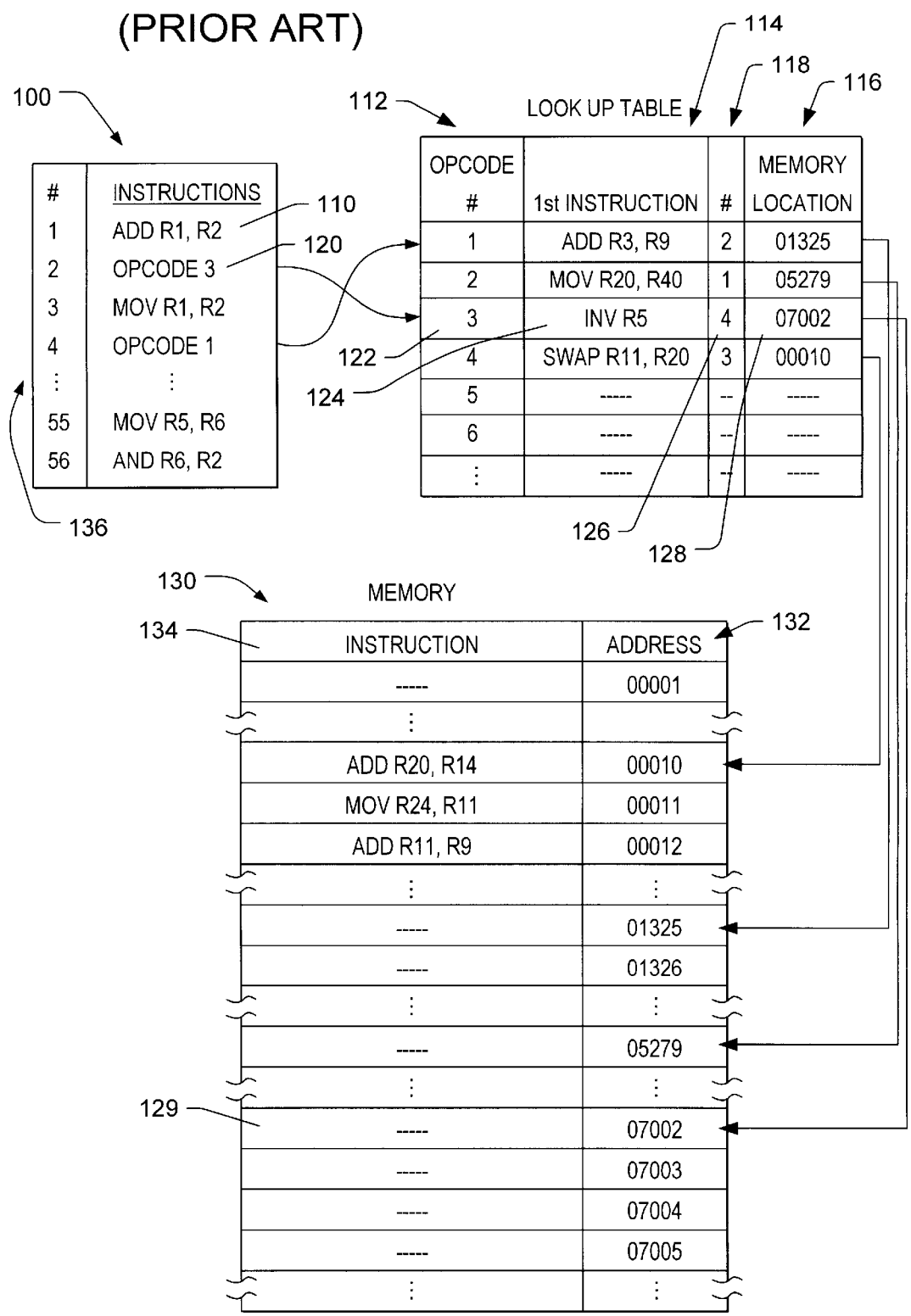
FIG. 1 is a schematic representation of interactions between a sequence of instructions interleaved with opcodes, a look-up table, and a microroutine storage location according to a prior art approach.
Figure 2:
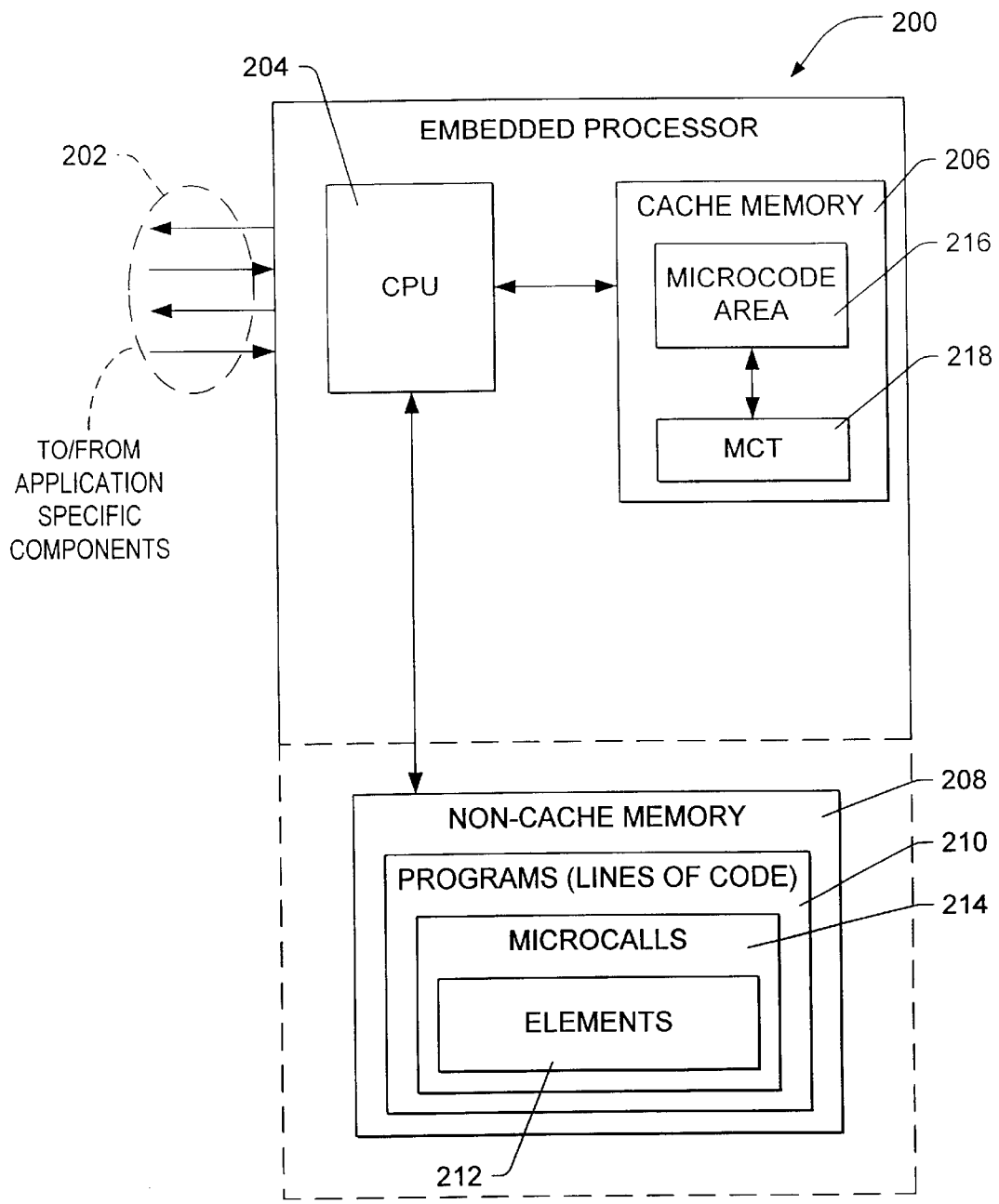
FIG. 2 is a schematic representation of exemplary hardware elements utilized in one embodiment of the present invention.

As shown in FIG. 2, a preferred embodiment of the present invention contains an embedded processor 200 which may be suitably connected by a plurality of interconnects 202 to other components within a device/system. The embedded processor 200 contains a number of components configured to perform its calculation and controlling functions. Embedded processor 200 preferably contains a CPU 204, cache memory 206, and non-cache memory 208. The cache memory 206 preferably includes a Micro Code Area ("MCA") 216 (within which microroutines are suitably stored) and a Microroutine Contiguity Table ("MCT") 218. The non-cache memory 208 preferably contains storage locations for at least one program 210 which can be further subdivided into individual lines of code interspersed with microcalls 214. Each line of code and microcall 214 preferably additionally contains Elements 212. For purposes of this invention, however, any CPU, cache memory, and/or non-cache memory may be utilized and configured using techniques known in the art. Thus, the present invention is not to be limited to any specific processor, memory, configuration, or the like and is to be considered as including all embodiments which utilize the compression technique of the present invention.

Figure 3A:
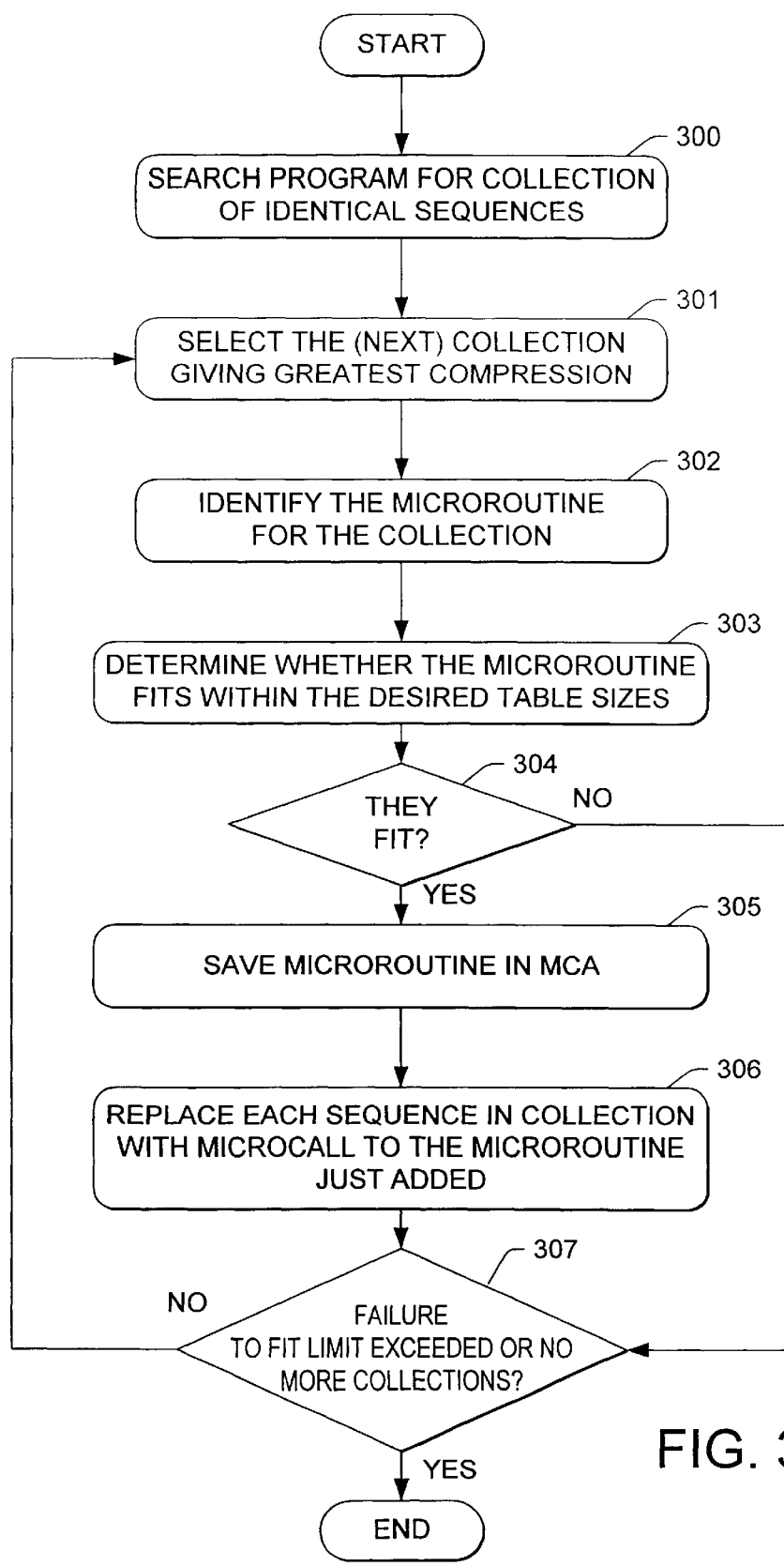
FIG. 3a is a flow chart depicting a first compression method of a first embodiment of the present invention.

As shown in the flow chart in FIG. 3a, the compression method of the present invention preferably begins with searching a program for identical sequences of lines of code, sequences of lines of code which include repeated patterns, and the like using standard sequence identification techniques (step 300). This search may encompass basic instruction blocks and/or other sequences of lines of code which may include jumps. Numerous sequence identification schemes are commonly known in the art, the present invention does not address the method of finding sequences of lines of code, hence any method, including the use of wildcards, greedy algorithms, or the like may be suitably utilized in the present invention to identify sequences of lines of code which occur with enough frequency to justify compression. Additionally, since it is common to allocate a given quantity of memory to a particular program, the present invention utilizes known approaches for optimizing the compression of sequences commonly occurring in a program. In each collection, the first sequence of lines of code added to the collection during the search will be identical to itself, and hence it will have no associated replacements.

Once the examination of the program for common sequences is accomplished, one of the collections is selected (step 301). The basis of this selection is preferably that replacement in the program of each sequence in the collection by a microcall results in the greatest compression of all the collections which might be so selected. However, the present invention is not so limited, any theory of compression and selection of sequences for compression is considered to be within the scope of the present invention.

After a collection is identified in step 301, preferably one incidence of the sequence of lines of code from the identified collection is preferably designated as a microroutine (step 302). Next, a determination is made as to whether sufficient space exists in a suitable memory location to store the earlier selected microroutine (step 303). In one embodiment of the present invention, the MCA 216 (as shown in FIG. 2) within which microroutines are suitably stored in memory may have a limited amount of memory. If storing the microroutine selected in step 302 would require more memory space than is available (step 304), then the microroutine is not saved and the compression processing preferably proceeds by selecting another collection (i.e., the compression technique returns to step 301). However, the present invention is not to be construed as being limited to any particular size for the MCA 216. Thus, the present invention may be suitably modified to accommodate the compression of any and (if desired) all collections of sequences of lines of code.

If the microroutine selected in step 302 fits within the MCA 216, then the microroutine is suitably saved in the MCA 216 (step 305). Additionally, each sequence of lines of code in the collection is replaced in the program by a microcall to the saved microroutine (step 306). The compression processing then verifies whether the MCA 216 contains room for additional microroutines (step 307). If room exists, the compression processing preferably returns to step 301 and selection of another collection suitable for compression is performed.

Once the MCA 216 is full, (step 307) the compression processing is preferably complete. If a collection fails to fit within the MCA 216 for a microroutine, this failure is preferably noted. In a particular application of the present invention, a limit can be suitably placed on the number of such failures which are consecutive. This limit can be used as one of the criteria for ending the compression processing (i.e., step 307). Another criterion for ending the compression processing can be that there are no further collections from which to select, and similar criteria. The present invention, however, may be suitably configured to utilize any criteria for ending compression processing.

Figure 3B:
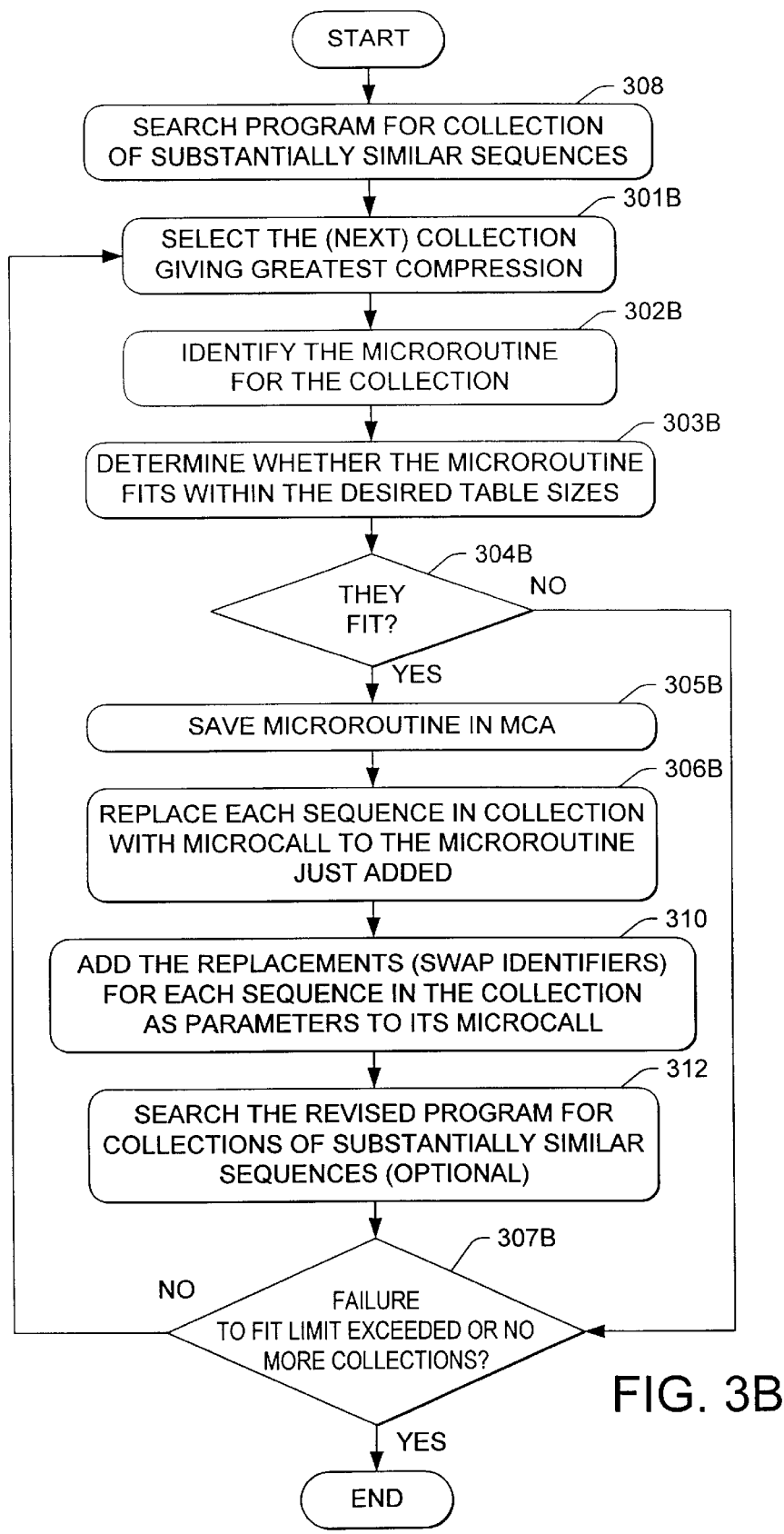
FIG. 3b is a flow chart depicting a second compression method of a second embodiment of the present invention.

In a second embodiment of the present invention, as shown in FIG. 3b, the program may be searched to identify sequences of lines of code which are not identical but are "Substantially Similar" (step 308). For purposes of this description, "Substantially Similar" sequences of lines of code are those that are either identical or which vary by a predetermined number of Elements. An Element shall be considered within this description to be any portion of or an entire a line of code (e.g., a particular register, an opcode value, or any other portion of or line of code). "Substantially Similar" sequences may be portions of a basic instruction block, an entire basic instruction block, portions of a program, and the like. Thus, a first sequence of lines of code is "Substantially Similar" to a second sequence either when the sequences are identical or if the sequences can be made identical by the replacement of all occurrences of a first Element in a first sequence with a second Element in the second sequence.

For example, the following two sequences of lines of code are Substantially Similar because the second sequence is identical to the first sequence if the occurrences of the Element R4 in the second sequence are replaced by Element R7. The first and second sequences are:

| First Sequence: | Second Sequence: |
|---|---|
| Line 1: MOVE R10 (to) R7 | Line 1: MOVE R10 (to) R4 |
| Line 2: ADD 2 (to) R7 | Line 2: ADD 2 (to) R4 |
| Line 3: MOVE R7 (to) R10 | Line 3: MOVE R4 (to) R10 |

(Note: the boldface type is for purposes of identifying the Substantially Similar Elements)

Additionally, under a preferred embodiment of the method of the present invention a sequence of lines of code is also Substantially Similar to another sequence if they can be made identical by the replacement of several Elements in the other sequence of lines of code with several other Elements. For example, the following third sequence is Substantially Similar to the above first sequence because the third sequence can be made identical with the first sequence by replacing all occurrences of Element R5 with Element R7 and with the replacement of all occurrences of the Element (opcode) ADD with Element (opcode) MULTIPLY. Similarly, the following fourth sequence is Substantially Similar to the above first sequence because the fourth sequence can be made identical to the first sequence with the replacement of two Elements, R4 with R7 and R9 with R10. The third and fourth sequences are:

| Third Sequence: | Fourth Sequence: |
|---|---|
| Line 1: MOVE R10 (to) R5 | Line 1: MOVE R9 (to) R4 |
| Line 2: MULTIPLY 2 (by) R5 | Line 2: ADD 2 (to) R4 |
| Line 3: MOVE R5 (to) R10 | Line 3: MOVE R4 (to) R9 |

The present invention searches the entire program for common sequences which can be of any size or construction. Since one sequence of lines of code is often exactly the same as another sequence of lines of code except an Element is different, the present invention also preferably identifies these sequences as being suitable for compression. Thus, under the preferred embodiment of the present invention, the first sequence above is preferably designated as a microroutine (e.g., the microroutine named I3, as shown below).

Microroutine I3:

Line 1: MOVE R10 (to) R7

Line 2: ADD 2 (to) R7

Line 3: MOVE R7 (to) R10

For this second embodiment, the compression processing after identifying collections of Substantially similar sequences (step 308), preferably continues through steps 301B–306B (as per the first embodiment). In step 310, the compression processing suitably adds the replacement Elements for each sequence of lines of code which makes each sequence Substantially Similar to the microroutine previously selected in step 302B as parameters of the specific microcall. Thus, for the second embodiment of the present invention, each microcall preferably contains an identification of the previously identified microroutine to be executed and (if applicable) the Elements which are to be replaced in the microroutine. For example, in our above example, each of the four sequences are suitably replaced by the following parameterized microcalls (MCALL):

First Sequence:
  Line 1: MCALL I3
Second Sequence:
  Line 1: MCALL I3, R4 (replaced by) R7
Third Sequence:
  Line 1: MCALL I3, R5 (replaced by) R7, MULTIPLY (replaced by) ADD
Fourth Sequence:
  Line 1: MCALL I3, R4 (replaced by) R7, R9 (replaced by) R10.

Thus, as shown above, in a preferred embodiment, Substantially Similar sequences may extend over part of a basic instruction block, over an entire basic instruction block, or over multiple basic instruction blocks or portions thereof. In short, under the compression method of the present invention, sequences of lines of code which are different only because a predetermined number of Elements are different are suitably stored as a single microroutine.

However, the format of a microcall is not to be construed as being limited to the format identified in the previous examples, any format which identifies the microroutine that is to be executed and which Elements in the microroutine are to be replaced (if any) is to be considered as being within the scope of the present invention. As shown by the preceding example, the technique of the present invention suitably allows any number of Element changes. Particular implementations of the present invention may have a restriction on the number of parameters (and hence the number of Element changes) allowed in a microcall. For example, a particular implementation of the second embodiment of the present invention, may allow at most two parameters per microcall. In such an implementation, then during the compression processing and search of the program (i.e., step 308), an equivalent restriction is suitably employed for the number of Element substitutions allowed which makes any sequence Substantially Similar to another sequence in a collection.

Additionally, the second embodiment of the present invention preferably contains an additional and optional compression step (step 312) during which the compression processing suitably re-searches the revised program (i.e., the program after Substantially Similar sequences of lines of code have been replaced by microcalls and microroutines) for collections of Substantially Similar sequences (i.e., the present invention is suitably configured to identify sequence of lines of code and/or microcalls as Substantially Similar, thus potentially resulting in even greater compression of the original program).

Figure 3C:
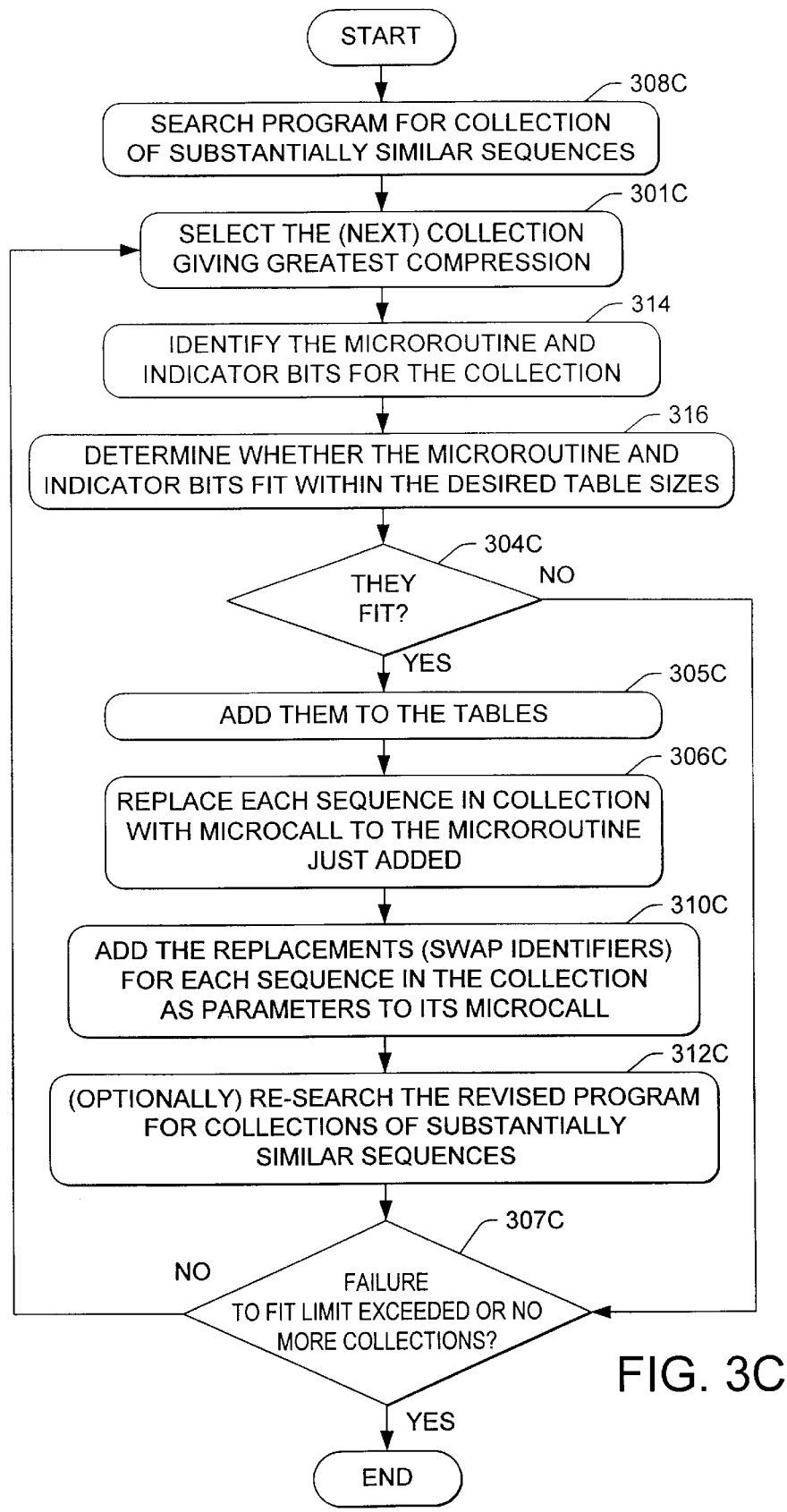
FIG. 3c is a flow chart depicting a third and preferred compression method of a third embodiment of the present invention.

In the preferred embodiment of the present invention, as shown in FIG. 3c, indicator bits are identified with each line of code in a microroutine (step 314). Preferably the indicator bits identify the last execution line of code in a microroutine such that a processor can identify when to exit a microroutine and return to the program. Preferably, these indicator bits are loaded into the MCT 218 and correspond with a specific line of code stored in the MCA 216. Additionally, the indicator bit for each line of code in the microroutine is set to indicate either that the microroutine is finished or that the microroutine is not finished. For a line of code in a microroutine which takes program control flow out of the microroutine and is not, itself, a microcall, the indicator bit is preferably set to indicate that the microroutine is finished. For example, a jump from the sequence of lines of code in a microroutine to some other part of the program would have its indicator bit set to indicate that the microroutine is finished.

Figure 4:
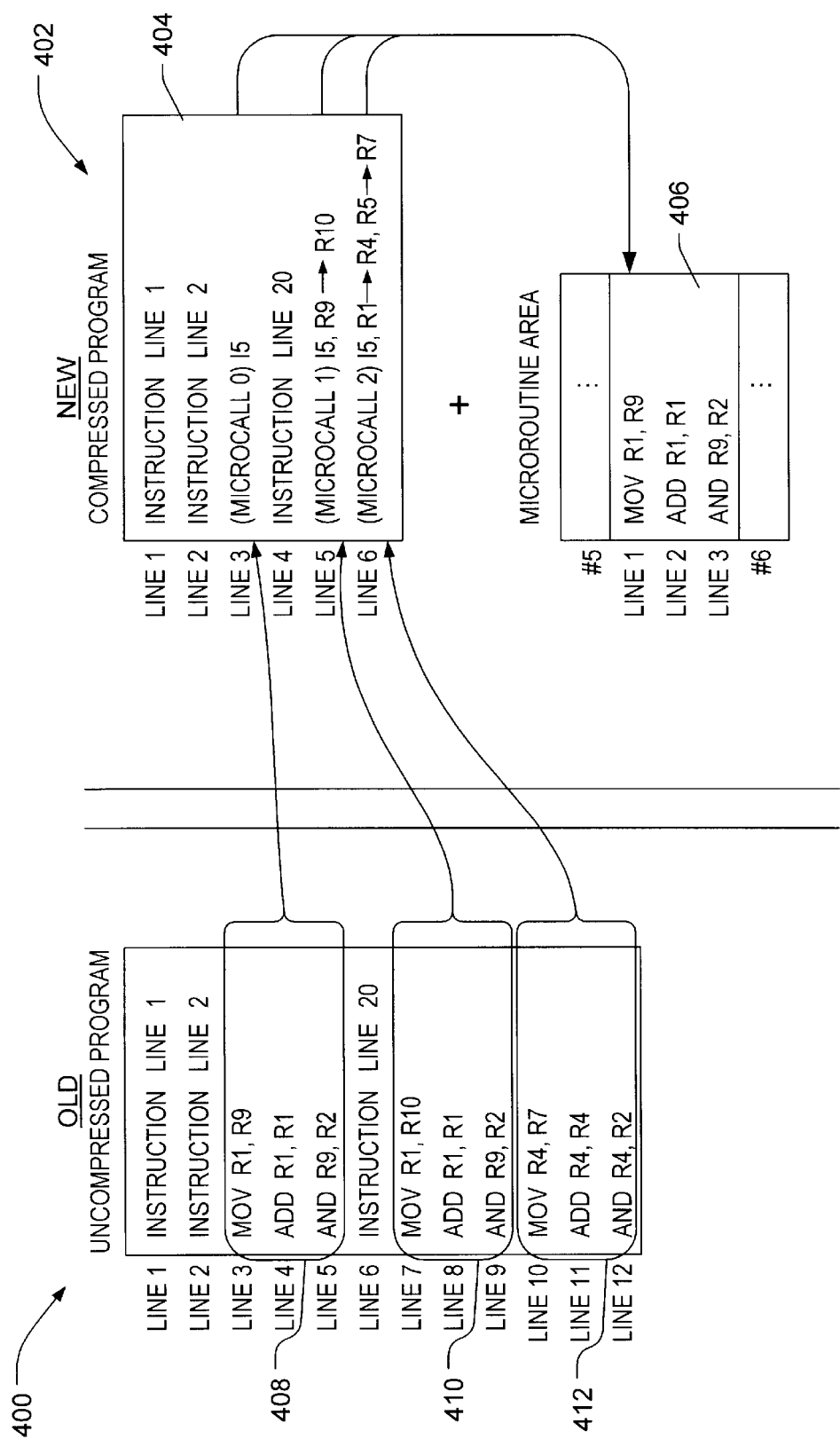
FIG. 4 is a schematic representation of an exemplary microcall substitution scheme utilized by one embodiment of the present invention.

Thus, under any of the embodiments of the compression method of the present invention, common sequences of lines of code are suitably replaced by microcalls that are associated with specific microroutines. For example, as shown in FIG. 4, an original program code 400 which contains twelve lines of code may be suitably compressed (by the method of the present invention) into a compressed program 402 which contains nine lines of code (as shown, the nine lines of code contains six lines of code 404 and three lines in a microroutine 406). In particular, the sequence of lines of code identified by number 408 are suitably compressed by assigning microroutine number five (I5) as an indicator of the uncompressed lines. However, I5 may be suitably modified by using register nine (R9) instead of register ten (R10) (as designated by microcall number 1 in line 5 of the compressed program) in the sequence of instructions 410 in the uncompressed program 400. Similarly, number 412 designates a sequence of lines of code which are "Substantially Similar" to the sequence 408 except two Element swaps are needed, R4 for R1, and R7 for R9. Thus, after compression under the technique of the present invention, the program preferably is a sequence of lines of code which contains interleaved original sequences of non-compressed lines of code and microcalls.

The present invention preferably allows the location of the microroutine to be incorporated directly into the microcall, along with the parameters (i.e., the designation of the Elements to be substituted). This location indicator in the microcall may be either relative to the start of the MCA 216 or the absolute address of the microroutine in memory. Instead of direct incorporation, the present invention also allows each of the microroutines to be indexed (for example, numbered sequentially). The index number is then suitably incorporated into each microcall. In this case, the present invention suitably provides a microroutine index table which translates the microroutine index number into a memory address (or the like) of the first line of code within the microroutine. This microroutine index table, however, requires the addition of an index line, consisting of the relative or absolute location of the microroutine, to the table for each microroutine added to the MCA 216.

When the program is executed, the non-compressed sequences are preferably executed normally without any additional tasks or steps required. Since the microroutines are not compressed, the microcalls do not require any real-time decompression or additional tasks. By not compressing the microroutines, the present invention also eliminates the need for complex identification schemes (e.g., look-up tables) which are commonly used when compressed code sequences which contain jumps are utilized.

Figure 5A:
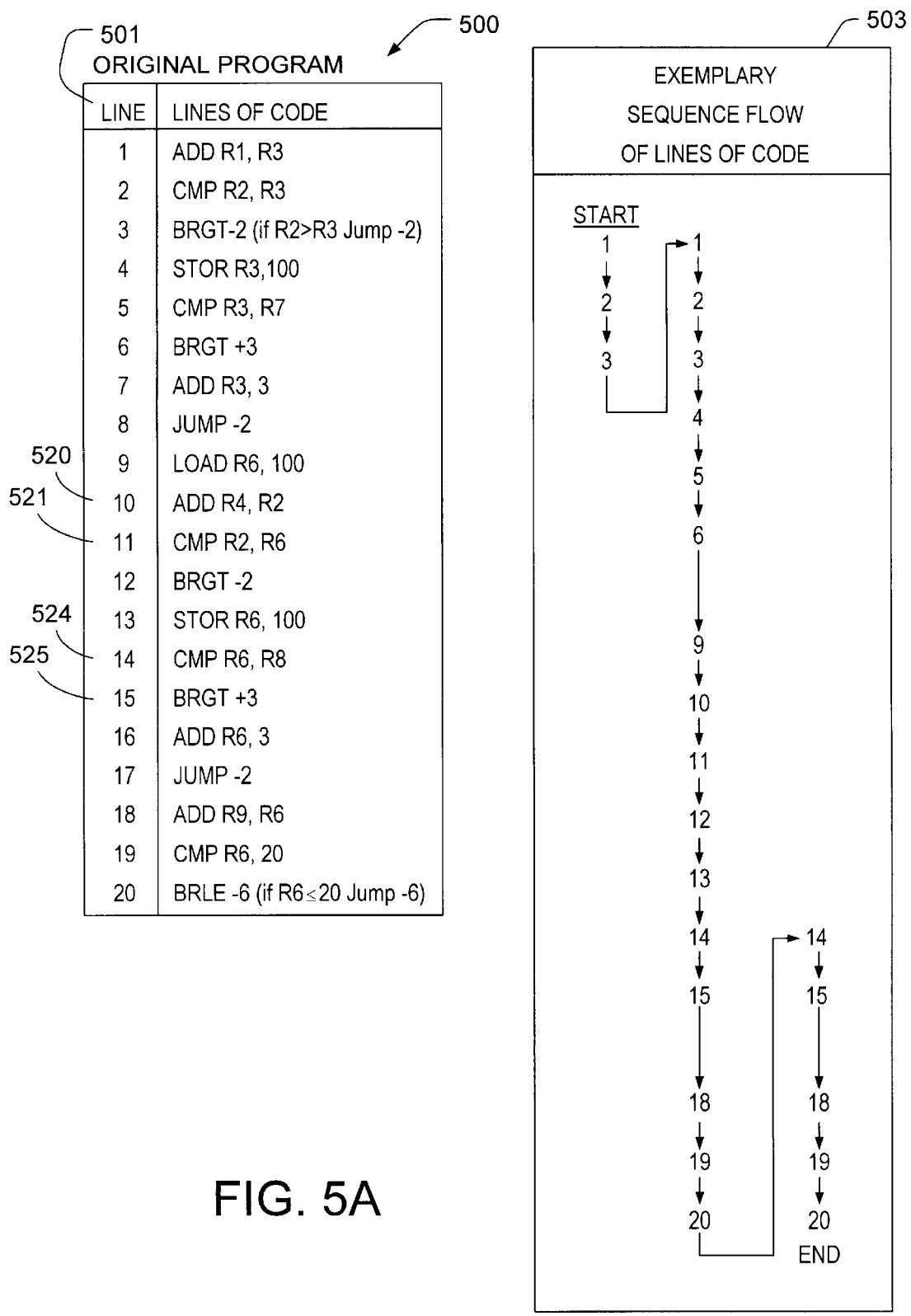
FIG. 5a is a schematic representation of sequences of lines of code containing a jump before being compressed.
Figure 5B:
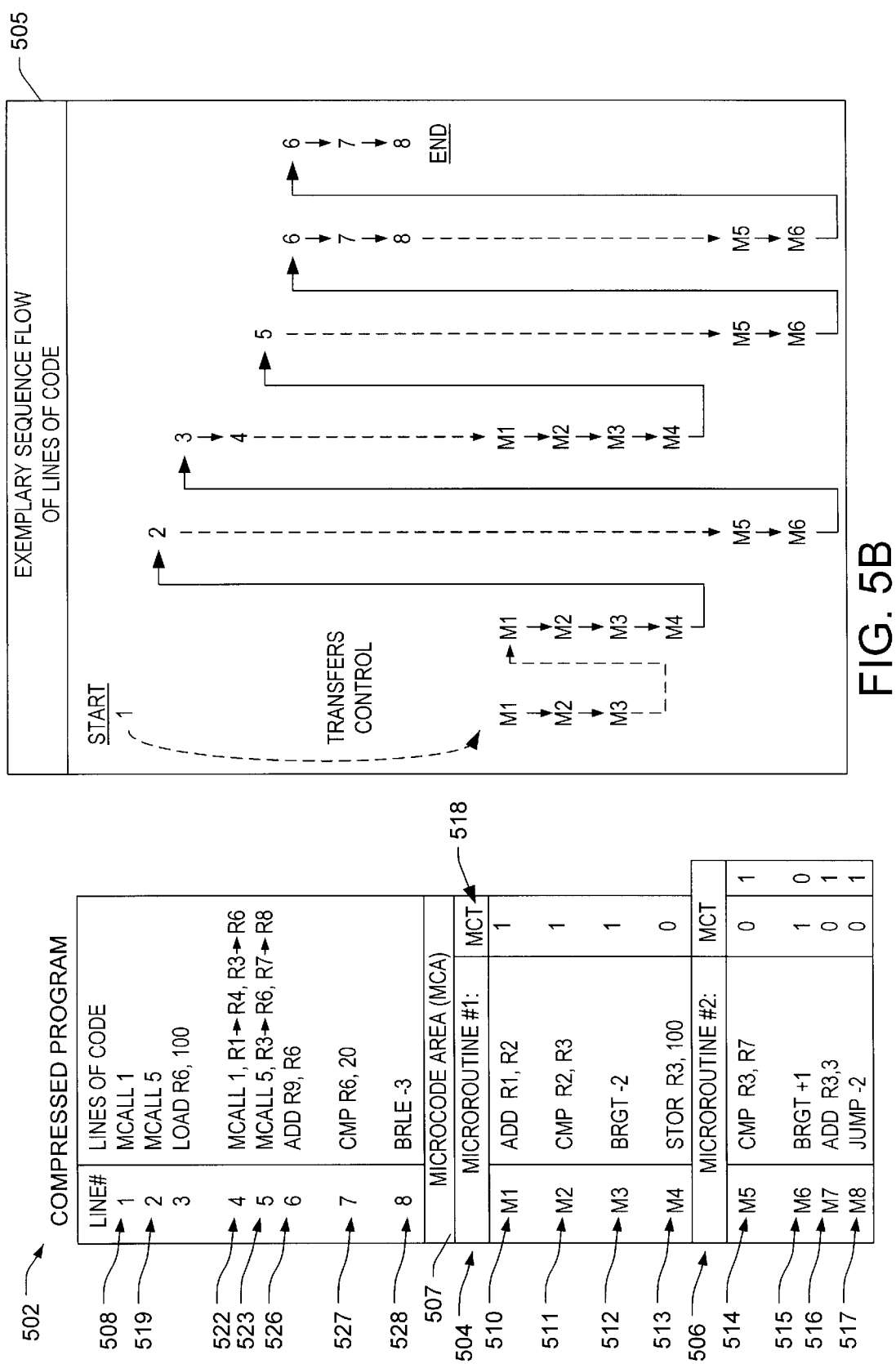
FIG. 5b is a schematic representation of sequences of lines of code containing a jump after being compressed by one embodiment of the present invention.

For example, as shown in FIG. 5a, an original program 500 containing twenty lines of code may be suitably compressed by the present invention into eight lines of new program code 502 and two microroutines 504 and 506. As the processor suitably executes each line of code in the original program 500, a conceivable flow sequence 503 could execute the following original lines of code 501 in the following order: 1, 2, 3, 1, 2, 3, 4, 5, 6, 9, 10, 11, 12, 13, 14, 15, 18, 19, 20, 14, 15, 18, 19, and 20. As shown in FIG. 5b, the equivalent flow sequence 505 in a program compressed 502 by a preferred embodiment of the present invention is as follows: 1, M1, M2, M3, M1, M2, M3, M4, 2, M5, M6, 3, 4, M1, M2, M3, M4, 5, M5, M6, 6, 7, 8, M5, M6, 6, 7, 8. The effect of the flow sequence in the compressed program is preferably the same as the sequence given for the original program 500.

More specifically, in the compressed program 504 when the processor encounters the first microcall at line number one 508, the processor preferably transfer control to the first line, M1, 510 in the Microcode area 507 (i.e., the first line in Microroutine #1 504). Control then proceeds with M2 511 and M3 512. At line M3, 512, the processor encounters a conditional branch which transfers control to M1 510, again. The second time the processor encounters M3 512, as in the original program flow sequence the branch is not taken and control proceeds to line M4 513. After executing line M4 513 and because the corresponding bit in the MCT 518 indicates a return (a 1 bit value), control proceeds to line two 519 of the compressed program. Here, the processor encounters another microcall. This time, the microcall indicates that control should proceed to the fifth line, M5, 514 of the MCA 507. After executing line M5 514, the processor encounters line M6 515 which in this example is a conditional branch and its indicator bit in the MCT 518 shows that a return is indicated.

In the case of a conditional branch in the MCA 507, we assume for purposes of this example only, that the processor has been modified to execute the jump of a conditional instruction only after the control point has been returned to the microcall instruction, and not to return if the branch condition is invalid. That is, the condition of the branch also preferably controls whether the "return" indicator bit value of the MCT 518 is effective. While such an embodiment allows greater program compression than is otherwise possible, it is not required in order to implement the compression method of the present invention. In this example, the branch condition is valid and control returns to the microcall and then the "JUMP+1" of the branch to the instruction following the microcall, line three 512, is effected.

When the microcall of line four 513 of the compressed program is encountered, the processor preserves its replacement parameters and control proceeds to the first line of code 510 (M1) of the MCA 507. The processor then performs the replacements it has earlier preserved (i.e., prior to executing each line of code from the MCA 507). This same preservation procedure suitably occurred for the microcall in line one 508. However, since the microcall in line one 508 has no parameters, the processor preserves the fact that no replacements are to be made when executing lines of code from the MCA 507. Thus, when line M1, (i.e., "ADD R1, R2" is executed with the substitutions R1→R4 and R3→R6, the line looks the same as line ten 520 in the original program (i.e., "ADD R4, R2"). Similarly, when line M2 511 (i.e., "CMP R2, R3") is executed with the same substitutions, line M2 511 looks the same as line eleven 521 in the compressed program (i.e., "CMP R2, R6"). After executing lines M1, M2, M3, and M4, control returns to the instruction following the line four microcall 522 because the MCT 518 bit for line M4 513 indicates a return (i.e., a "0").

Similarly, when the microcall of line five 523 of the compressed program 502 is encountered, the processor preserves its replacement parameters, discarding the previous parameters, and control proceeds to the fifth line of code 514 (M5) in the MCA 507. The preserved substitutions make lines M5 514 and M6 515 equivalent to line fourteen 524 and line fifteen 525, respectively, of the original program 500. As in the original program 500, processing control returns to line five 514 microcall (M5) and the "JUMP+1" effect is to transfer control to line six 526. Control then proceed to line seven 527 and line eight 528. Note that the branch target offset in line eight 528 has been altered from "−6" in the original program to "−3" to reflect the fact that some of the lines of code from the original program have been compressed into a microcall. Control proceeds from line eight 528 to line five 525 and continues using the mechanics previously described.

Thus, as shown by the previous example, the compression technique of the present invention suitably accommodates jumps and conditional branches. While the present invention has been described in the context of the example above, any method of processing jumps, conditional branches, and the like may be suitably accommodated by the present invention without departing from the spirit of the present invention. Thus, upon execution, a program seamlessly processes non-compressed instructions and microroutines.

As is known in the art, programs for embedded processors may exist in either ROM or RAM. When a program compressed by the compression technique of the present invention is stored in ROM, the microroutines are preferably stored, in an uncompressed format, in an area of ROM identified (for purposes herein only) as the Loadable Microroutine Area (LMA). The remainder of the program is preferably also stored in ROM in an uncompressed format. Thus, when a compressed program is stored in ROM, it may be executed preferably without any real-time decompression.

When a variety of programs are utilized by an embedded processor, often the entire individual programs are compressed and then each program is decompressed as needed and loaded into RAM. While this method of compressing and decompressing entire programs is commonly known in the art, the compression technique of the present invention allows the programs to be as small as possible without decompression. When the entire program is compressed and then accessed via RAM, the compression technique of the present invention preferably provides a compressed program and an associated section of code (hereafter, the "Routine Code") which contains all the microroutines. When a specific compressed program is to be executed by the embedded processor, preferably the Routine Code is read into the LMA while the individual program steps are uncompressed, loaded, and read in the usual manner of loading programs into RAM.

Figure 6:
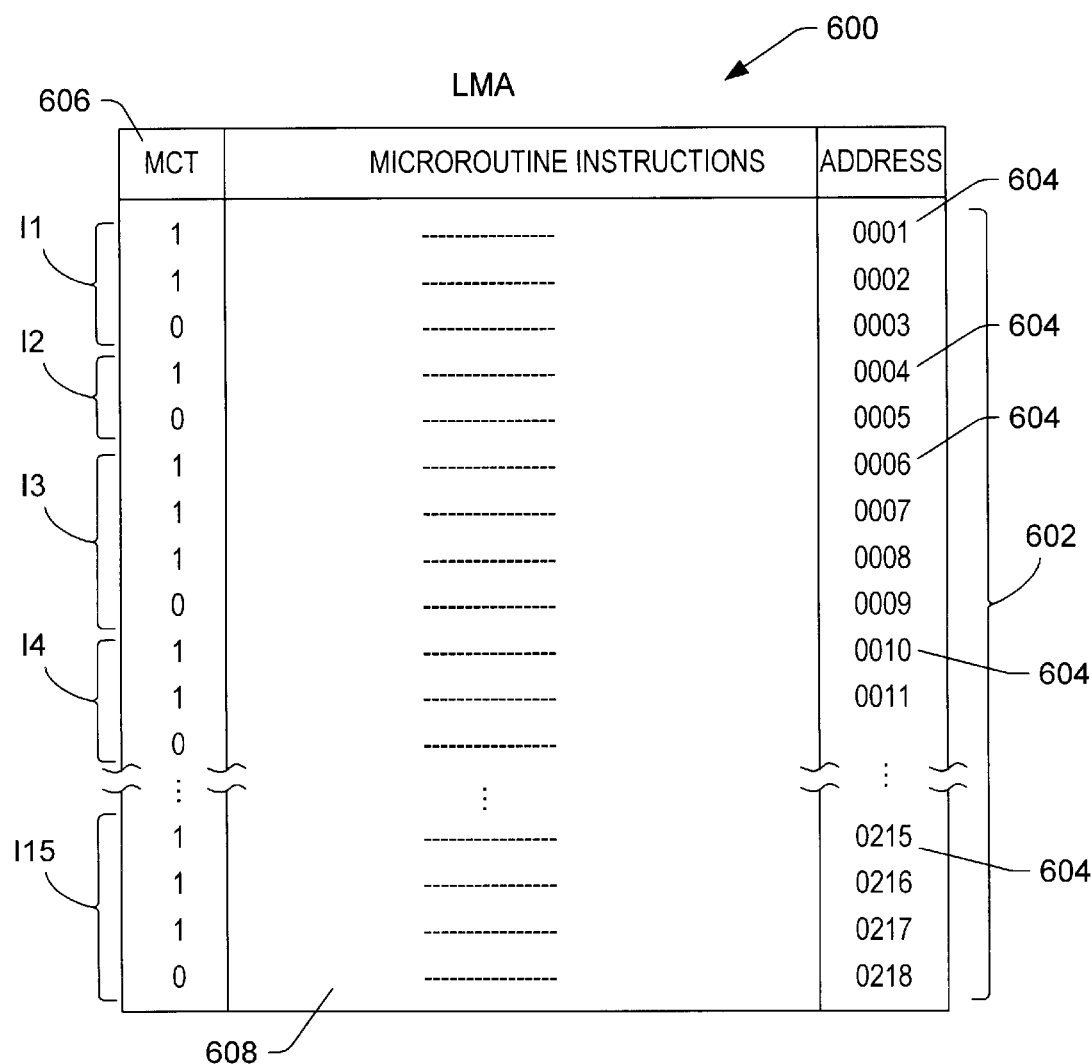
FIG. 6 is a schematic representation of an exemplary last execution instruction determination approach utilized by one embodiment of the present invention.

More specifically, when the program is to be read from RAM and the Routine Code is loaded into the LMA 600, as shown in FIG. 6, the Routine Code is preferably comprised of a sequence of microroutine instructions 602 each of which may contain a variable number of individual instructions 608. Each line of code of each microroutine is preferably identified by an address 604 (i.e., 1, 2, 3, 4, . . . 15, etc.). The address 604 of the microroutine is preferably used by microcalls to identify a specific microroutine. Since the LMA 600 preferably is a continuous length of memory containing line after line of code 608 and microcalls preferably designate only the starting address of a specific microroutine, under the method of the present invention the last line to be executed of each microroutine is preferably identified by an indicator bit within the MCT 606.

In the MCT 606, a line of code 608 which is not the last line of code to be executed in a microroutine is suitably indicated by a one (1), while a line of code 608 which is the last line of code in a microroutine is suitably indicated by a zero (0). Thus, when an embedded processor is implementing a microcall, preferably the processor proceeds to the address 604 or starting location designated by the microcall, and then steps through the lines of code in the LMA 600 until a zero (0) is detected in the MCT 606. In order to accomplish this orderly progression, the processor may check every line of code 608 to see whether the corresponding entry in the MCT 606 is a one (1) or a zero (0). In an alternative embodiment, the MCT 606 entry may suitably be appended to either the beginning or the end of a line of code, or the line of code may be suitably modified with a parity bit such that an even parity line of code is not the last line of code to be executed in the microroutine while an odd parity line of code is last, or vice versa. Thus, while the present invention is described in the context of a MCT 606, it is to be understood that the present invention is not so limited. Any method which uses a recognizable indicator rather than an instruction or a line of code (e.g., a single or a few bits) to designate the last line of code in a microroutine is considered to be within the scope of the present invention.

While the present invention is described in the context of an LMA 600 with an associated MCT 606, it is to be understood that any method of storing, and determining the location of microroutines, especially the first and last lines of code in a microroutine, is considered to be within the scope of the present invention. For example, the MCT 606 of the present invention could be suitably replaced with a return indicator appended to the end of every microroutine, by a line of code counting approach, or the like. For the preferred embodiment of the compression technique of the present invention, however, an MCT 606 with a single bit last line of executed code designator is utilized.

In addition to providing for the substitution of registers within a compressed program, in an alternative embodiment of the compression technique of the present invention, the substitution of addresses (for example, where a result is to be stored or from where retrieved), operands (a variable, constant, or function upon which an operation is to be performed, for example, A=B+3, where B and 3 are the operands), entire instructions, and the like is provided. By suitably expanding the width of a microcall or the number of lines of code within a microcall, any number of substitutions may be accomplished. For example, a sequence of lines of code which contains five lines of code and is exactly the same as another sequence with five lines of code except the third line of code utilizes a different operand, instruction, or the like. Both of these sequences can be suitably compressed by the method of the present invention by providing for an Element swap identifier in the microcall. For example, a microcall could be suitably configured as such: I4, i3–i45, R5–R6 wherein I4 designates the desired microroutine; i3–i45 instructs the processo to substitute the third line of code in microroutine I4 with the 45$^{th}$ line of code (or sequence of lines of code) in the program (thereby utilizing sequences of lines of code which already exist elsewhere in the program); and R5–R6 instructs the processor to substitute the fifth register encountered in microroutine I4 with the sixth register contained in a register table. While this is one example of how the compression method of the present invention enables the greater compression of programs in embedded processors, any method which provides a substitution mechanism for replacing commonly used sequences of lines of code, operands, registers, conditional calls, or the like is considered to be within the scope of the present invention.

In a third embodiment of the present invention, the compression technique of the present invention provides a microcall routine which indexes a look-up table. In this approach, the microcall itself maybe limited to a byte, for example, without limiting the number of substitutions which could occur. The microcall of this embodiment would preferably indicate the microroutine to be implemented and the location of the parameter, instruction, operand, or opcode (hereafter "Elements") to be changed in a substitution look-up table. Since the substitution look-up table preferably is not confined to a fixed length, any number of microroutine Elements may be specified for substitution. Under this approach, greater compression of programs occurs.

Additionally, an MCT, return instruction, counter, or the like may be suitably configured to indicate when the last substitution for a particular microroutine is accomplished. Thus, the present invention may be modified in various ways to substitute microroutine Elements in accomplishing the compression technique of the present invention. All of these variations are considered to be within the scope of the present invention.

Although the present invention has been disclosed in conjunction with numerous embodiments, the scope of the present invention is not to be limited to one particular embodiment. Modification may be made to the process flow, techniques, materials used, or another element, factor, step, or the like without departing from the scope of the present invention as expressed in the following claims.

What is claimed is:

1. A method of compressing a program utilized by a processor in controlling the operation of an associated device, wherein said program has at least one original sequence of lines of code and each line of code comprises at least one Element; said method comprising the steps of:
   a. identifying a first sequence of lines of code;
   b. identifying a second sequence of lines of code wherein said first sequence and said second sequence are Substantially Similar;
   c. identifying any varying Element in said second sequence which varies from a corresponding Element in said first sequence and wherein all non-identified Elements in said first sequence and said second sequence are identical;
   d. assigning a microroutine designator to said first sequence;
   e. assigning an Element designator to said varying Element, wherein said Element designator identifies that said corresponding Element is to be replaced by said varying Element;
   f. assigning a microcall designator to each of said first and second sequences, wherein said microcall designator references said microroutine designator;
   g. selecting a first sequence from a plurality of first sequences of lines of code which optimizes the compression of said program; and
   h. assembling a sequence of lines of code comprised of said lines of code of said program interleaved with said microcall designators, wherein said microcall designators replace those sequences of code Substantially Similar to those sequences of lines of code selected for optimization.

2. The method of claim 1 wherein said microcall designator further comprises at least one Element designator.

3. The method of claim 1 wherein said processor is an embedded processor.

4. The method of claim 1 wherein said Element is a parameter.

5. The method of claim 1 wherein said Element in an instruction.

6. The method of claim 1 wherein said Element is an operand.

7. The method of claim 1 wherein said Element is an opcode.

8. The method of claim 1 wherein said program includes jumps.

9. The method of claim 1 wherein said program includes conditional branches.

10. The method of claim 1 wherein said program is stored in Random Access Memory.

11. The method of claim 1 wherein said program is stored in Read Only Memory.

12. The method of claim 1, wherein said method further comprises the steps of:
   i. determining a last execution line of code for each of said first sequences of lines of code; and
   j. marking said last execution line of code with a last line identifier.

13. The method of claim 12 wherein said last line identifier is a single bit attached to said lines of code.

14. A method of implementing a compressed program, wherein said compressed program comprises a program sequence of lines of code, each of said lines of code comprising at least one Element, said lines of code including at least one non-compressed instruction and at least one microcall, wherein each incidence of said microcall references at least one microroutine, each of said microroutines providing a starting location of a second sequence of lines of code and each line of code of said second sequence comprising at least one Element; said method comprising the steps of:
   a. executing said program sequence until a line of code containing a microcall is encountered;
   b. proceeding to said starting location provided by said microroutine referenced by said microcall;
   c. executing said second sequence at said starting location provided by said microroutine; and
   d. returning to said program sequence at the line of code immediately after said microcall from which said program sequence proceeded in step b.

15. The method of claim 14 wherein said method further comprises the step of:
   e. continuing steps a–d until all desired lines of code have been executed.

16. The method of claim 14 wherein said microcall contains at least one Element swap identifier, wherein said Element swap identifier identifies each Element to be replaced and a replacement Element, and wherein step b comprises the steps of:
   b1. examining said microcall for the presence of at least one Element swap identifier;
   b2. preserving said Element swap identifiers; and
   b3. proceeding to said starting location provided by said microroutine referenced by said microcall.

17. The method of claim 16 wherein said step c executes each line of code of said second sequence of lines of code while replacing each Element preserved in step b2 with said replacement Element designated in said Element swap identifier.

18. A program compressed from an original program sequence of lines of code utilized in a processor comprising a central processing unit, memory, and at least one interface with an associated device, wherein said program comprises:
   a first sequence of lines code;
   a microroutine, wherein each incidence of said microroutine references a second sequence of lines of code, said second sequence differing from said first sequence by at least one Element; and
   at least one microcall interleaved within said first sequence of lines of code, wherein said microcall references said microroutine; wherein
   said microcall identifies Elements in a third sequence of lines of code which are different than specific Elements in said second sequence;
   said microcall directs substitution of said Elements in said second sequence with said Elements in said third sequence; and said third sequence is Substantially Similar to said second sequence.

19. The program of claim 18 wherein said second sequence further comprises at least two lines of code which occur in Substantially Similar form in at least two sequences in said original program sequence of lines of code.

20. The program of claim 19 wherein said substitution occurs at the time of execution of said microcall and, at other times, said second sequence is unaltered.

21. The program of claim 18 wherein said second sequence of lines of code comprises a plurality of execution lines of code including a last execution line of code; and further wherein the last execution line of code of said second sequence is indicated by a single bit appended to each line of said second sequence.

* * * * *